(12) United States Patent
Mansfield et al.

(10) Patent No.: US 8,954,198 B2
(45) Date of Patent: Feb. 10, 2015

(54) METHOD AND SYSTEM FOR CONTROL OF ENERGY HARVESTING FARMS

(75) Inventors: Richard J. W. Mansfield, Cambridge, MA (US); Daniel Shani, Newton, MA (US); Nissim Shani, Newton, MA (US)

(73) Assignee: Energy Intelligence, LLC, Newton, MA (US)

( * ) Notice: Subject to any disclaimer, the term of this patent is extended or adjusted under 35 U.S.C. 154(b) by 237 days.

(21) Appl. No.: 13/136,764

(22) Filed: Aug. 10, 2011

(65) Prior Publication Data
US 2013/0211605 A1 Aug. 15, 2013

Related U.S. Application Data (60) Provisional application No. 61/461,414, filed on Jan. 18, 2011.

(51) Int. Cl.
| G05B 13/02 | (2006.01) |
| H02K 7/18 | (2006.01) |
| F03G 7/08 | (2006.01) |
| H02N 2/18 | (2006.01) |

(52) U.S. Cl.
CPC ............. *G05B 13/02* (2013.01); *Y02E 10/725* (2013.01); *H02K 7/183* (2013.01); *F03G 7/08* (2013.01); *H02N 2/18* (2013.01); *H02K 7/1807* (2013.01); *H02K 7/1853* (2013.01)
USPC ............... 700/286; 700/79; 700/275; 290/1 R (58) Field of Classification Search
CPC .................................................... H02K 7/1807
USPC .......................................................... 700/286
See application file for complete search history.

(56) References Cited

U.S. PATENT DOCUMENTS

| 2007/0100506 A1* | 5/2007 | Teichmann | 700/297 |
| 2008/0262820 A1* | 10/2008 | Nasle | 703/18 |
| 2010/0133855 A1* | 6/2010 | Daya | 290/1 R |
| 2010/0198420 A1* | 8/2010 | Rettger et al. | 700/291 |
| 2011/0298222 A1* | 12/2011 | Bailey et al. | 290/1 R |

OTHER PUBLICATIONS

Katsumata, Akito Japanese Patent No. JP 08156795A with English machine translation included. Jun. 1996.*

* cited by examiner

*Primary Examiner* — Mohammad Ali
*Assistant Examiner* — Emilio J Saavendra
(74) *Attorney, Agent, or Firm* — William A. M. Mansfield (57) ABSTRACT

Certain embodiments of the invention may include control systems and methods for monitoring environmental variables, performance variables and conditioning electrical power in energy-recapture sources of mechanical energy, which would otherwise be dissipated, as exemplified by farms for energy-harvesting to provide available electrical energy. Said farms may include one or more energy-recapture sources. One method for controlling may include measuring individual source energy output of one or more energy-recapture sources and measuring conditions of one or more energy-recapture sources via a controller that facilitates communication with one or more energy-recapture sources.

13 Claims, 8 Drawing Sheets

METHOD AND SYSTEM FOR CONTROL OF ENERGY HARVESTING FARMS

PRIOR APPLICATION

This present application claims under 35 U.S.C. 119(e) the benefit of the prior filing date of Application No. 61/461,414 filed on Jan. 18, 2011.

REFERENCES CITED

U.S. PATENT DOCUMENTS

| Number | Inventors | Issue Date | U.S. Classification |
|---|---|---|---|
| 5,278,773 | Cousineau | January 1994 | 364/494; 364/492 |
| 5,642,984 | Gorlov | July 1997 | 416/176 |
| 6,155,892 | Gorlov | December 2000 | 440/9 |
| 09/828,500 | Pionzio et al. | March 2002 | 700/286; 700/287 |
| 6,407,484 | Oliver et al. | June 2002 | 310/339 |
| 7,023,160 | Virtanen and Pasuri | April 2006 | 318/438 |
| 7,429,801 | Adamson et al. | September 2008 | 310/339 |
| 7,432,611 | Stahlkopf et al. | October 2008 | 290/44; 290/55; 363/34 |
| 20/100,114,397 | Cardinal et al. | May 2010 | 700/297 |
| 12/582,353 | Walling et al. | June 2010 | 700/287; 700/297 |

CROSS-REFERENCE TO RELATED APPLICATIONS

This application is related to co-pending U.S. patent application Ser. No. 13/135,493 filed Jul. 7, 2011 and entitled "Method and System for Energy Harvesting," the disclosure of which is incorporated by reference herein in its entirety.

STATEMENT REGARDING FEDERALLY SPONSORED RESEARCH OR DEVELOPMENT

Not Applicable.

TECHNICAL FIELD

The present invention relates generally to recapturable energy harvesting, more particularly, to systems and methods for controlling electrical power in energy recapture from mechanical sources.

BACKGROUND

Energy conservation and climate change mitigation have fostered the development of alternatives to the direct use of fossil fuels. Light to electrical energy conversion in the form of solar panels is one alternative. Electrical energy generated by conventional wind turbines is another alternative. In both of these cases, a large area often in a remote geographical location is required so that many solar panels or wind turbines can be assembled into farms to provide significant generation from renewable resources. Among other challenges, the remote location results in power transfer loss when connecting to the National Power Grid.

An alternative [see application Ser. No. 13/135,493] that takes advantage of existing real estate to generate power close to potential usage sites and users on the National Power Grid is the harvesting of otherwise dissipated energy from the movement of vehicular traffic.

Just as farms of solar panels and of wind turbines require control systems (addressed in previous patents listed), so do farms of modules engaged in energy-harvesting from vehicular traffic given the following special characteristics:

1. Mechanical energy conversion modules are subject to abrasion
2. Modules are exposed in a public space to road hazards rather than in fully secured areas
3. Modules not in protected area are exposed at night in isolation to human and animal vandalism
4. Modules operation and maintenance must minimize traffic interruptions
5. Module operation to maintain and assist vehicular safety is critical Having noted the common challenges, a need will likely arise for a central system to control the operation and coordination of the energy-harvesting farms. For example, a utility may monitor the grid power demand and may need to communicate with the energy-harvesting farm to determine if the farm has the capacity to meet some or all of the power demand. As the number of energy-harvesting modules increases it is important that the collection of inverters appears to the grid as if it was the same as for other power plants. Because an energy-harvesting farm can include many mechanical-to-electrical energy conversion modules with power inverters there is a need for a centralized control to collectively manage the inverters along with all of the supporting energy farm data as one cohesive system. Such a control system must take into account that the Energy Harvesting Modules are in relatively close proximity for a given installation and vehicular traffic flow varies over a 24-hour period. As more energy farms come online, the communication, coordination, and control among the plurality of farms becomes more and more critical. However, coordination also becomes more difficult when the multiple energy farms (with their multiple associated controllers) are tied together in ad-hoc systems. Therefore, a need exists for systems and methods for controlling power in recapturable energy sources.

ADVANTAGES

The present invention is a control system for coordinating and monitoring the performance of power-recapture modules that convert mechanical energy, which would otherwise be dissipated, into available electrical energy. Said invention teaches an innovative and comprehensive approach to the command and control of farms of modules deployed for energy harvesting from vehicular and ambient motion.

SUMMARY OF THE INVENTION

Some or all of the above needs may be addressed by certain embodiments of the invention. Certain embodiments of the invention may include systems and methods for controlling power in energy recapture sources, for instance, integrated real-time power and energy harvesting farm control. The present invention overcomes the limitations of conventional approaches by providing a power-recapture method for energy that would otherwise be dissipated; and by deploying the system in close proximity to energy consuming users and devices. Aspects and advantages of the invention will be set forth in part in the following description, or may be obvious from the description, or may be learned through practice of the invention.

One embodiment of the invention is a system for energy recapture that converts mechanical energy that would otherwise be dissipated into available electrical energy with high efficiency and optimal control and manageability. This embodiment employs a novel approach with a plurality of computer-coordinated Electric Generators that are arranged with salient sensors that detect appropriate motion then adjust the phasing and intensity of electromagnets of each Electric Generator to optimally convert variable mechanical motion into electric current.

According to another example embodiment, the system may include an energy farm including one or more energy recapture sources, one or more remote monitoring and control stations, one or more devices for measuring aggregate energy output from the energy farm, one or more devices for measuring individual source energy output from the one or more energy recapture sources, and a real-time controller for controlling power production of the one or more energy recapture sources based at least in part on the measured aggregate energy output and the measured individual source energy output, where the controller is operable to communicate with the one or more recapturable energy sources.

According to an example embodiment of the invention, a method is provided for controlling an energy harvesting farm, where the farm may include one or more recapturable energy sources. The method may include measuring aggregate energy output of the energy harvesting farm and measuring individual source energy output of the one or more energy harvesting sources. The method may also include controlling energy production from the one or more recapturable energy sources via a controller based at least in part on the measured aggregate energy output and the measured individual source energy output, where the controller facilitates communications with the one or more energy recapture sources.

According to another example embodiment, an apparatus is provided for controlling energy recapture. The apparatus may include a real time integrated controller operable to: measure aggregate energy output from an energy harvesting farm, where the energy harvesting farm comprises one or more energy recapture sources, measure individual source energy output from the one or more energy recapture sources, control energy production from the one or more recapturable energy sources based at least in part on the measured aggregate energy output and the measured individual source energy output, and communicate with the one or more recapturable energy sources.

Variations and modifications can be made to these exemplary embodiments of the present disclosure. Other embodiments and aspects of the invention are described in detail herein and are considered a part of the claimed invention. Such other embodiments and aspects can be understood with reference to the following detailed description, accompanying drawings, and claims.

BRIEF DESCRIPTION OF THE FIGURES

A full and enabling disclosure of the present invention, including the best mode thereof, directed to one of ordinary skill in the art, is set forth in the specification, which makes reference to the appended figures, which are not necessarily drawn to scale, and wherein.

DETAILED DESCRIPTION OF THE PREFERRED EMBODIMENT

Reference now will be made in detail to embodiments of the invention, one or more examples of which are illustrated more fully in the drawings. Each example is provided by way of explanation of the invention, not limitation of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. In fact, it will be apparent to those skilled in the art that various modifications and variations can be made in the present invention without departing from the scope or spirit of the invention. For instance, features illustrated or described as part of one embodiment can be used with another embodiment and such variations come within the scope of the appended claims and their equivalents.

Like numbers refer to like elements to those skilled in the art. Like numbers refer to like elements throughout. The term "exemplary" as used throughout this document is defined to mean "example." It will be appreciated that terms such as "left", "right", "top", "bottom", "inwardly", "outwardly", "front", "inner", "up", and "down" and other positional descriptive terms used herein below are used merely for ease of description and refer to the orientation of the components as shown in the Figures. It should be understood that any orientation of the elements described herein is within the scope of the present invention.

The present invention overcomes the limitations of conventional approaches by providing a power-recapture method for energy that would otherwise be dissipated; and by deploying the system in close proximity to energy consuming users and devices.

Certain embodiments of the invention may enable control of power in energy-harvesting farms. According to certain exemplary embodiments of the invention, a real-time integrated controller may be utilized to facilitate increased interoperability and control within energy-harvesting farms. Other embodiments may be utilized to facilitate increased interoperability and control among multiple farms.

Various controllers, processors, modules, interfaces, communication links, and sensors for controlling power in energy harvesting farms, according to embodiments of the invention, will now be described with reference to the accompanying figures.

The Energy Harvesting System comprises six interconnected functional components:
1. Mechanical Energy Capture Device for transforming linear mechanical motion into rotational mechanical force.
2. Electric Generator for alternating current generation from mechanical rotational force.
3. Piezoelectric plate for sensing approaching objects and generating electrical power for the electromagnets in the Electric Generator to maximize efficiency at high rates of rotation. Secondarily the power will be stored in the battery noted below, or supplied immediately to the National Power Grid.
4. Controller with rectifiers to convert the output of the one or more Electric Generators and piezoelectric plates to direct current for storage or for transmission, with suitable phase and voltage control, to the National Power Grid; and for supplying current to the electromagnets of one or more Electric Generators
5. Storage Battery to retain the energies generated by one or more Electric Generators and by one or more piezoelectric plates.
6. Computer to coordinate and monitor the power generation for maximum efficiency. The computer can be wirelessly connected to the internet for remote monitoring and control.

It will be appreciated that these functional components may be combined to serve the same functional purposes, for example, the Mechanical Energy Capture Device and the Electrical Generator may be combined such that external surface of the Electrical Generator serves to capture mechanical energy for said Generator's rotor; similarly, the Computer for monitoring and coordination and the Controller may be combined to serve the functions of monitoring, coordination and power conditioning. It should be understood that any such combination of the functional components described herein is within the scope of the present invention.

In one embodiment, a stationary member, the piezoelectric plate, is positioned to receive compression strain as a wheeled vehicle advances over the surface below which the plate is mounted. The electrical signal thus generated serves to activate the electromagnets of the Electric Generator as a wheeled vehicle passes over a portion of the outer rotor of the Mechanical Energy Capture Device. The frictional contact of a wheel of the wheeled vehicle serves to transfer rotational energy from the wheel to the dynamic outer rotor of Mechanical Energy Capture Device that directly drives the rotor of the Electric Generator thus generating excess electrical energy that can be stored in the storage battery or with suitable phase and voltage control transmitted directly to the National Power Grid.

In a second embodiment of the Energy Harvesting System, vehicular traffic or the associated transient motion of the air itself exerts mechanical compression strain on a stationary member, a piezoelectric plate mounted in the path of the wheeled vehicle or at the suspension mount of the Mechanical Energy Capture Device. The electrical signal thus generated serves to activate the electromagnets of the Electric Generator as the Mechanical Energy Capture Device converts the translational air motion into rotational energy that directly drives the dynamic rotor of the Electric Generator thus generating excess electrical energy that can be stored in the storage battery or with suitable phase and voltage control transmitted directly to the National Power Grid.

Figure 1:
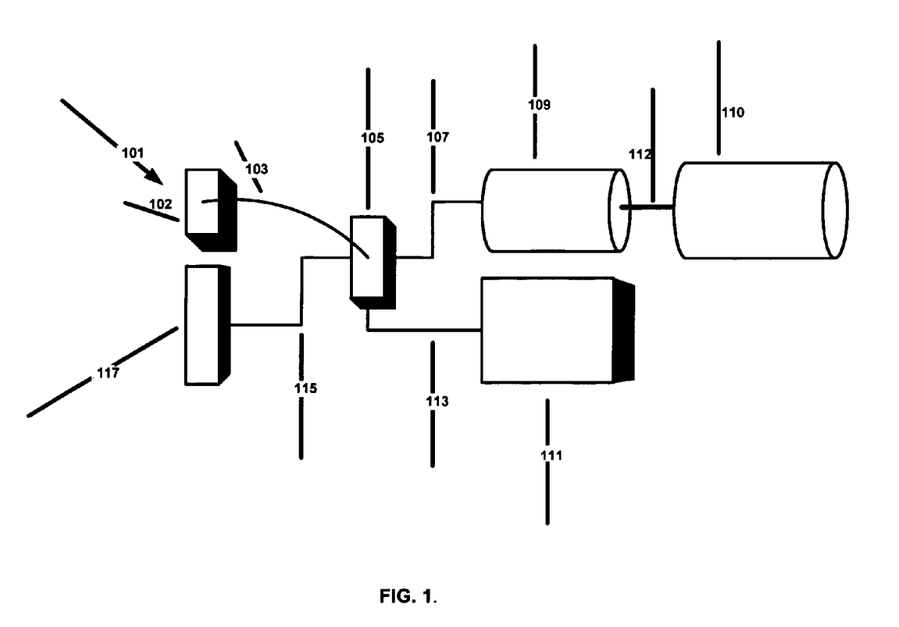
FIG. 1. Conceptual Schematic Diagram of the Power Generating Circuit

As shown in FIG. 1 the Energy Harvesting System provides for a cylindrical Electric Generator 109 positioned adjacent to a piezoelectric plate 111 both in electrical communication 107, 113 with a circuit controller 105. The system is positioned such that vehicles first pass over the region of the piezoelectric plate 111 before passing over the exposed portion of the Motion Energy Harvesting Device 110 that is directly coupled by a mechanical linkage 112 to the Electric Generator 109 to drive its rotor. The controller 105 uses the sensing signal from the piezoelectric plate 111 to adjust via 107 the current flowing in the electromagnets of the said Electric Generator 109 to maximize the conversion of rotational mechanical energy captured by the Motion Energy Harvesting Device 110 which is then imparted to the rotor of the Electric Generator to generate electrical energy that is conveyed via 107 and 115 to the storage battery 117 or with appropriate phase conversion and voltage amplification transmitted directly to the National Grid. The Motion Energy Harvesting Device 110 is exemplified by activation by the frictional contact of a vehicular wheel with the cylinder of the Device. However, alternate mechanical means, such as a gear activated by the vehicle's weight, would serve within the same Energy Harvesting Module and Control System for the Energy Harvesting Farm.

Figure 2:
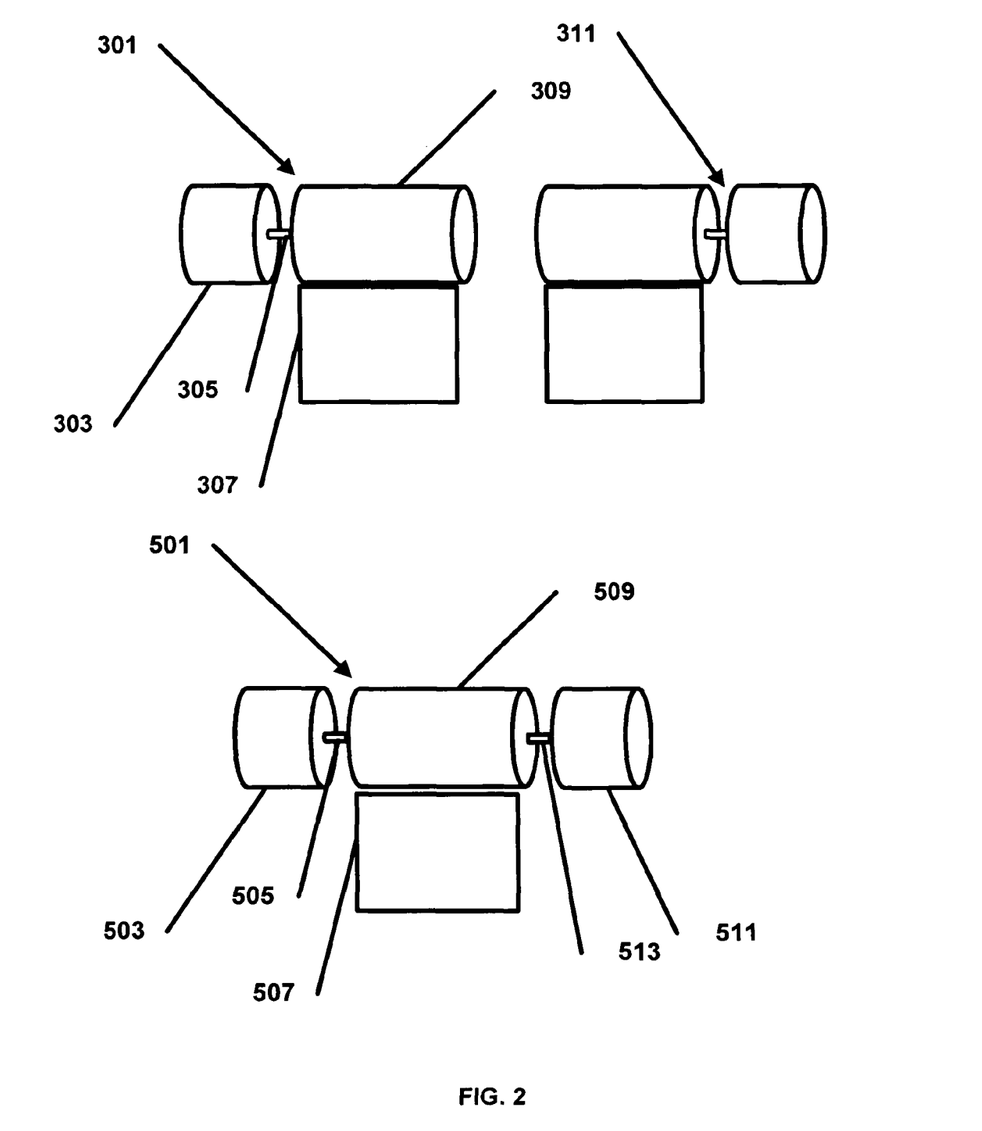
FIG. 2. Top Down Schematic View of a Plurality of Adjacent Energy Harvesting Modules Showing Placement of Mechanical Energy Transducer, Electrical Generator, Mechanical Energy Transfer Connector, and Piezoelectric Plates FIG. 2A Adjacent Modules with Single Electrical Generators.
Figure 2A:
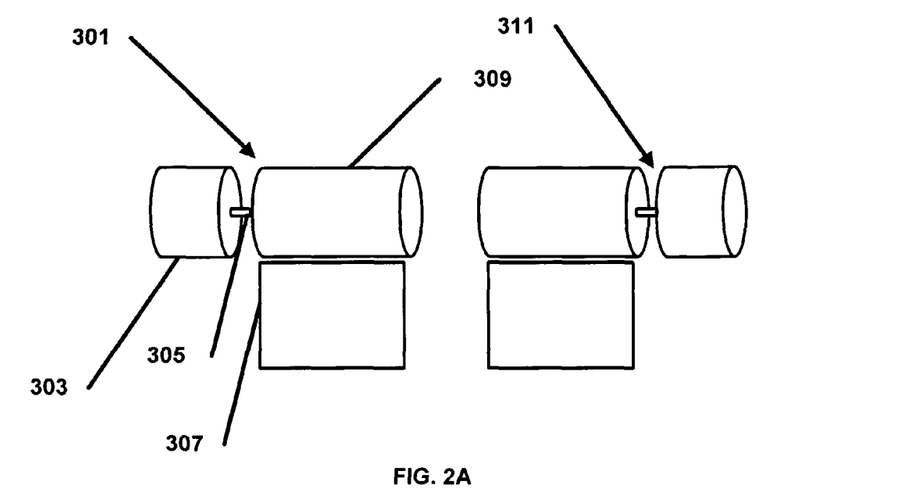
Figure 2B:
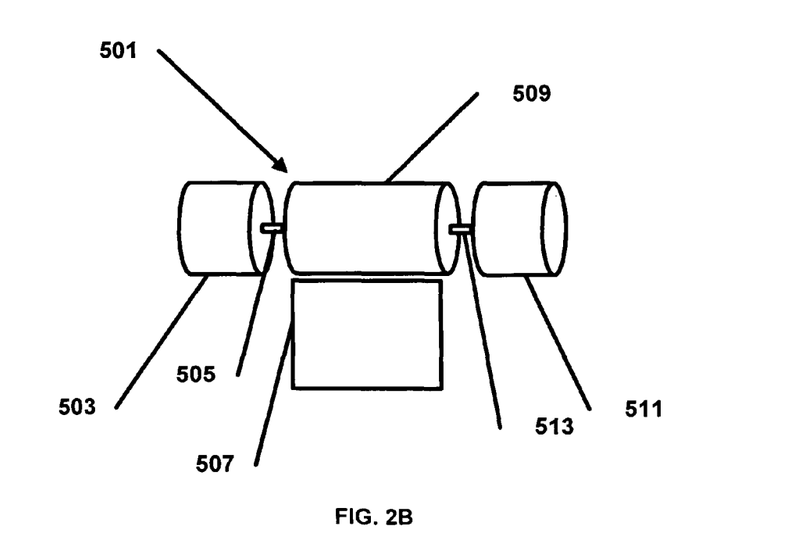
FIG. 2B Module with Dual Electrical Generators

As shown in FIG. 2A, a plurality of Energy Harvesting Modules 301, 311 constituting an Energy Harvesting Farm is arranged across a vehicular roadway with each Motion Energy Harvesting Device 309 and Electrical Generator 303 coupled mechanically by means of an axial rod 305 supported by fluid-filled, heavy-duty bearings and flanked by a sensing piezoelectric element 307. Piezoelectric sensors are positioned in the direction of motion of said moving vehicle but can serve as well regardless of the direction of motion of said vehicle. Each Motion Energy Harvesting Device has its axle mechanically coupled to that of its adjacent Electrical Generator in such a manner that the Motion Energy Harvesting Device can be decoupled and replaced easily should it become too worn or defective. Alternately, the Motion Energy Harvesting Device could be functionally combined with the Electrical Generator into a single unit if the outer surface of the Electrical Generator rotor were directly exposed to vehicular traffic. Separating the two components into a simple rotary drum in the exposed compartment and the more complex and expensive generator in a sealed compartment is a more economical design in the long run. Similarly, as shown in FIG. 2B for greater robustness and sustained performance an Energy Harvesting Module, 501, may include two Electrical Generators, 511 and 503, for a single Mechanical Energy Transducer, 509.

Figure 3:
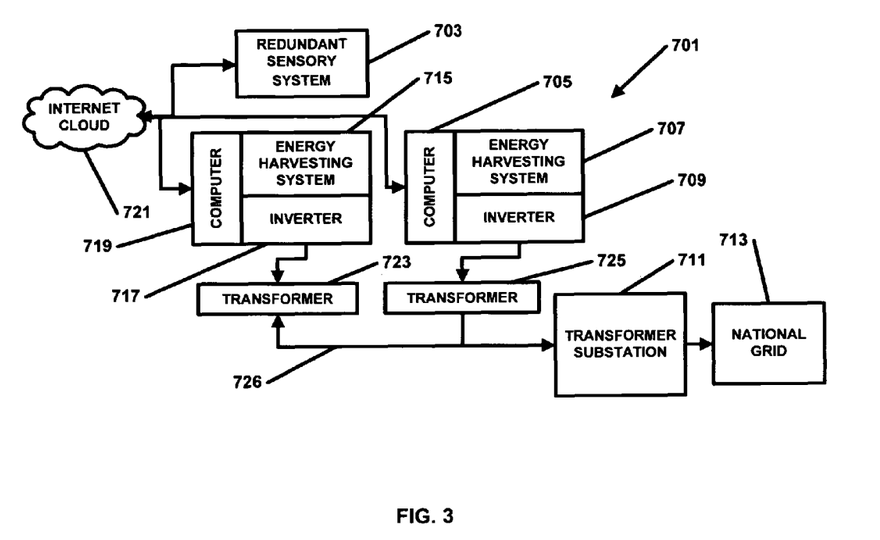
FIG. 3. Schematic Diagram of a Plurality of Energy Harvesting Modules Comprising a Power Generating Farm FIG. 4. Diagram of a Command and Control Communication System for an Energy Harvesting Farm FIG. 5. Computer Block Diagram of Sensory Monitoring System for Energy Harvesting Farm FIG. 6. Computer Block Diagram of Performance Monitoring System for Energy Harvesting Farm FIG. 7. Computer Block Diagram of Predictive Analytics System for Preventive Maintenance of Energy Harvesting Farm

In certain embodiments of the invention, the Energy Harvesting Farm Control System 701 comprising a plurality of Energy Harvesting Modules may measure the energy harvesting farm aggregate energy output and measuring the individual source energy output comprises measuring one or more of: voltage, current, frequency, real power, reactive power, power factor, and power factor angle. Moreover, the Energy Harvesting Farm Control System 701 may include any number of software applications that are executed to facilitate any of the operations of the Energy Harvesting System 707 or 715. Such software applications execute to perform one or more of the following standard electrical power generating functions functions: voltage regulation, power factor regulation, reactive power regulation, real power (watt) regulation, ramp rate control, startup control, shutdown control, voltage droop compensation, frequency droop compensation, and line drop compensation. The conditioned electrical power is sent through an Inverter 709 or 717 to a transformer 725 or 723. The optimized trade-off between copper-based reactance (communication lines 726) and iron-based reactance (transformers 723 or 725 and 711) reduces the losses in the power generated as the power generated increases and decreases over time. The power transfer is maximized by adjusting the complex conjugate of the internal impedance to the external load impedance as shown in the following equation:

$$Z_{internal} = j\omega L_s + \frac{\omega^2 M^2}{Z_p + j\omega L_p} \qquad \text{[Equation 1]}$$

Where Z[internal] is the internal impedance, L[s] is the substation capacitance, Z[rho] is the transformer impedance, L[rho] is the transformer capacitance, ω is the frequency and M is the coefficient of transfer. The Transformer Substation 711 provides conditioned power of the appropriate voltage and phase to the National Grid 713. The Transformer Substation 711 comprises one or more of: a substation with static VAR compensation and harmonic filter bank, and a transformer load tap changer. For extended reliability the computers can be solid state devices without moving parts using solid state disks and circuitry embedded in epoxy.

Figure 4:
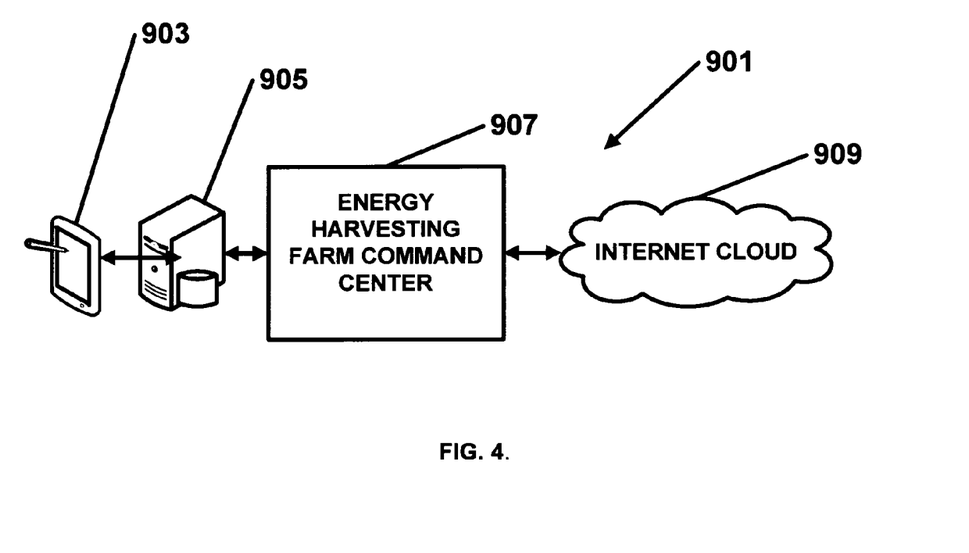

In certain embodiments the real-time integrated controller may communicate with any of the associated components in the energy farm control system via wireless communication, power line carrier, internet, intranet, or any other suitable means of communication. In FIG. 3 the computer-based controller 705 or 719 monitors and adjusts the Energy Harvesting System 707 or 715 and the Inverter 709 or 717 as well as the Transformer 723 or 725. The computer-based controllers communicate with an Energy Harvesting Farm Command Center (EHFCC) 901 as does a redundant sensor system 703 that measures conditions such as temperature, humidity, vehicular traffic and the presence of potential human or animal vandals.

In certain embodiments, one or more I/O interfaces may facilitate communication between the energy farm control system and one or more I/O devices. For example, a universal serial bus port, a serial port, a disk drive, a CD-ROM drive, and/or one or more user interface devices 903, such as a display, keyboard, keypad, mouse, control panel, touch screen display, microphone, etc., may facilitate user interaction with the energy farm control system at the Energy Harvesting Farm Command Center (EHFCC) 901. One or more I/O interfaces may be utilized to receive or collect data and/or user instructions from a wide variety of input devices. Received data may be processed by one or more computer processors as desired in various embodiments of the invention and/or stored in one or more memory devices 905.

One or more network interfaces 909 may facilitate connection of the energy farm control system inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

Figure 5:
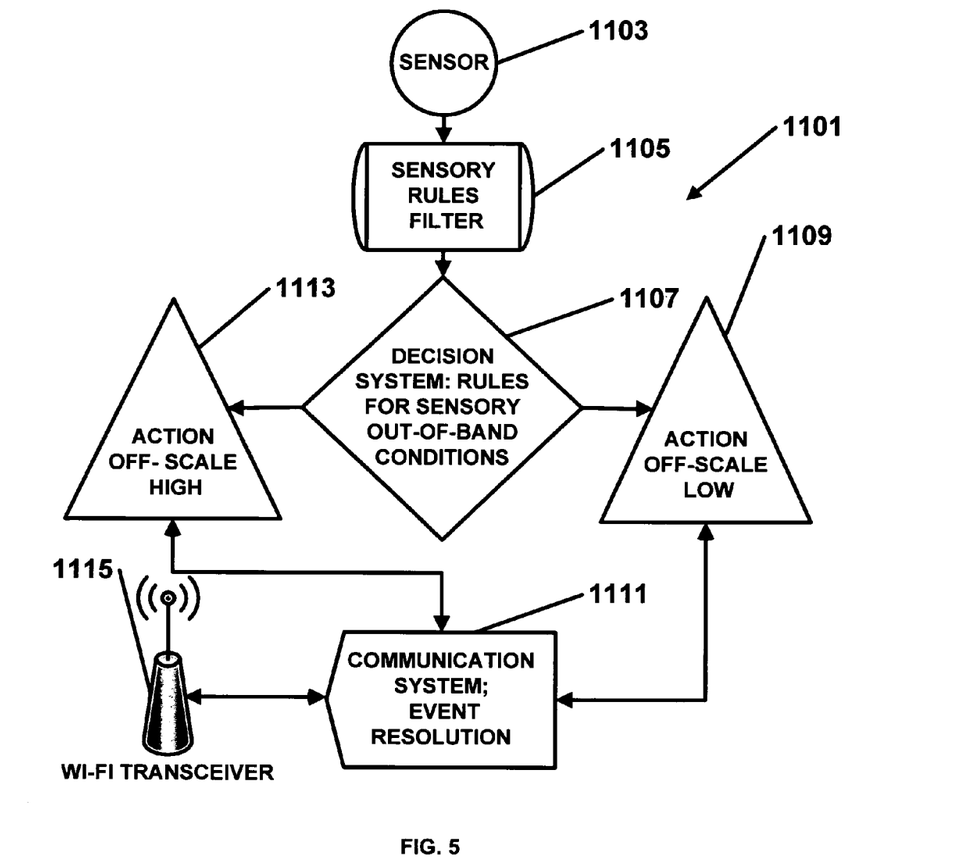

A farm of Energy Harvesting Modules is made more robust by having an environmental monitoring system as shown in FIG. 5. The operation of the modules can be affected by low temperatures as that will principally impact the efficiency of the lithium batteries and the resistance of the fluid bearings. Moreover, cold temperatures will shrink metallic components that may require mechanical compensation. Moreover, the formation of ice on the road surface constitutes a safety hazard as well as a source of reducing the friction necessary for the transfer of energy from moving vehicles to the energy harvesting system. Similar monitoring will be required for humidity, rain and wind. The control system electronics and computers can be protected by embedding them in expoxy and the use of solid state disks rather than standard hard drives. Moreover, the exposure of some aspects of the Energy Harvesting System, such as the transceivers, outside the buried module may attract vandals both human and animal requiring sensing and deterrence. In the Environmental Monitoring System 1101 of FIG. 5, a plurality of sensors, 1103, collect data that is filtered by a corresponding plurality of filters 1105. The filter outputs are compared with the expected normal range of values to determine out-of-band conditions 1107. Out-of-band environmental conditions that exceed 1113 or fall below 1109 are passed to the Event Resolution Communication System 1111. Either internal resolution is undertaken or a request for external resolution is signaled to the Energy Harvesting Farm Command Center (EHFCC) by the Wi-Fi transceiver 1115. A typical example of an internal resolution would be the detection of a malfunctioning battery or other functional component and the resultant switchover to the failover reduncant component. A typical example of an external resolution would be the detection of an unauthorized intrusion into the guarded proximity zone of a communication component, e.g., the Wi-Fi antenna, or into a module itself that cannot be averted by countermeasures, such as flashing lights or alarm sounds, and the resultant signal to EHFCC that power generation is at risk of interruption. The transceiver 1115 can also receive information from the EHFCC such as weather microcasts. In the case of either an internal or an external resolution, the event and its resolution is signaled to the EHFCC for logging. The transmitted sensor data to the cloud-based EHFCC can deal with missing data in the case a specific sensor fails or is blocked by inclement weather. The way that the EHFCC does this is shown in the following equation:

$$G \text{ sub } \phi(m|u) = \text{Prod}(i=1,N)\{\phi \exp(m \text{ sub } i)(1-\phi) \exp(1-m \text{ sub } i)\}, \qquad \text{[Equation 2]}$$

where G is the probability distribution of values and phi is the probability of missing the sensor reading.

Figure 6:
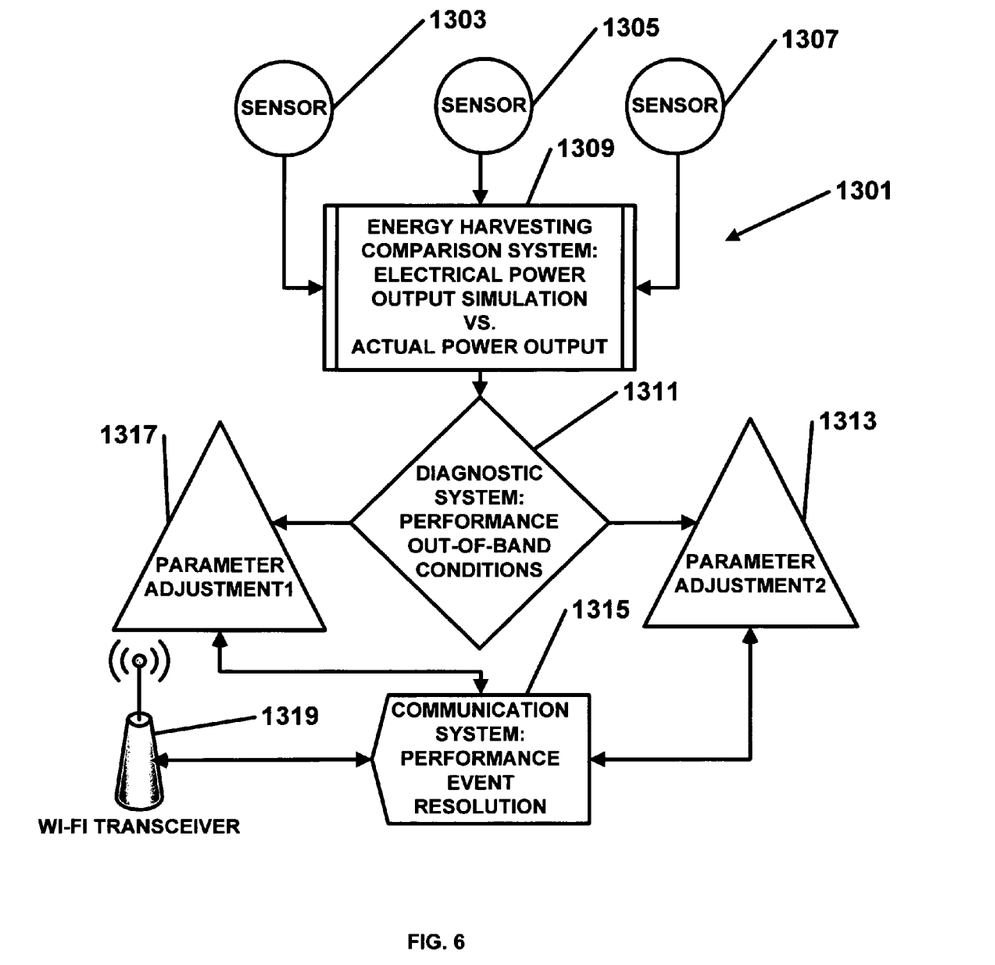

In addition to the surrounding environment the system itself requires monitoring so that minor conditions can be automatically adjusted (self-annealing) and major ones dealt with appropriately. As shown in FIG. 6, a monitoring and diagnostic system 1301 is deployed to maximize efficient power output from the Energy Harvesting System. A plurality of sensing probes as exemplified by 1303, 1305, 1307 feed into a comparator module 1309 that compares the realized actual power generated from the system with the statistical simulator of the output. The comparison is analyzed by a diagnostic system 1311, which effects a plurality of performance parameter adjustments as exemplified by 1313 and 1317. The outcome of any parameter adjustment in a performance event is communicated by the performance event resolution system 1315 and sent by the Transceiver 1319 to the EHFCC, which may modify or override the adjustment based on other considerations. Examples of performance probe measurements include electrical output, battery charge, mechanical energy harvester speed, vehicular speed, and fluid bearing differential. Such comparisons could track, for instance, the frictional effectiveness of the surface of the mechanical energy harvesting apparatus.

Figure 7:
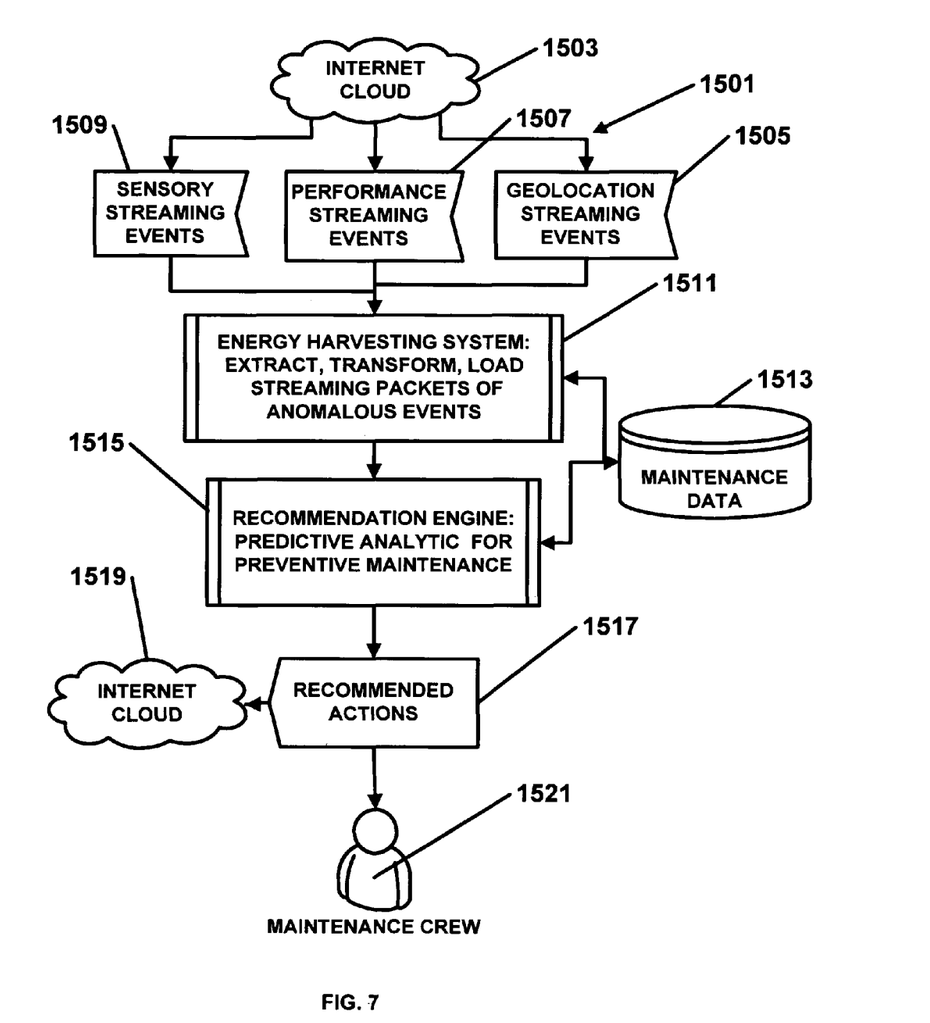

The Energy Harvesting Farm Operational Command and Control Center provides oversight of a plurality of Farms for several purposes, the principal one being anticipatory maintenance using advanced analytics so as to maximize uptime and hence output. The Preventive Maintenance System 1501 receives a plurality of inputs from remote Energy Harvesting Farms 1503 including environmental sensory event data 1509, performance event data 1507 and more general event data 1505 from the specific location, e.g. weather patterns. Packets of anomalous events are assembled 1511 and archived for historical data 1513. Some service data may be missing so the missing data imputation method of equation 2 is applied. Both datastreams serve as input to a Predictive Analytic Recommendation Engine for Preventive Maintenance 1515. Any resulting Action Recommendations 1517 from the Recommendation Engine 1515 are deployed back over the internet 1519 to the specific Energy Harvesting Farm if parameter adjustments can serve as preventive maintenance or to a human agent 1520 if repair or replacement is required.

As desired, embodiments of the invention may include the energy farm control system with more or less of the components illustrated.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope, of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described by reference to certain preferred embodiments, it should be understood that these embodiments are within the spirit and scope of the inventive concepts described. Accordingly, it is intended that the invention not be limited by the embodiments, but that it have the full scope permitted by the language of the following claims.

We claim:

1. A system for controlling and monitoring the electrical energy generated by an energy harvesting farm, the energy harvesting farm comprising one or more energy harvesting modules for converting mechanical energy from vehicular traffic into electrical energy, the system comprising:
  a) a real-time integrated controller for controlling power production of the one or more energy harvesting modules based at least in part on the measured aggregate energy output of the energy harvesting farm and the measured individual energy output of the one or more energy harvesting modules, wherein the real-time integrated controller is operable to communicate with the one or more energy harvesting modules, and wherein the one or more energy harvesting modules each comprises a motion energy harvesting device coupled to an electric generator that produces energy when vehicular traffic traverses over and rotates the motion energy harvesting device;
  b) a sensory monitoring real-time integrated controller forming a sensory monitoring subsystem, the sensory monitoring based at least in part on data from one or more environmental sensors, wherein said sensory monitoring real-time integrated controller is operable to communicate with the one or more energy harvesting modules;
  c) a performance monitoring real-time integrated controller forming a performance monitoring subsystem, the performance monitoring based in part on data from one or more measurements from the one or more energy harvesting modules, where the performance monitoring real-time integrated controller is operable to communicate with the one or more energy harvesting modules;

d) a safety monitoring real-time integrated controller capable of monitoring vehicular traffic for safety hazards wherein a detected hazard triggers protective actions, wherein the protective actions include operating electrical generators of the one or more energy harvesting modules as motors to rotate the motion harvesting devices in order to slow or stop a vehicle that poses the detected safety hazard, the safety monitoring based at least in part on input measurements from performance probes and environmental sensors; and e) a preventive maintenance controller forming a preventative maintenance subsystem, the preventative maintenance based in part on predictive analytics wherein the future performance of the energy recapture sources are estimated from current and historical data, and wherein the preventive maintenance controller is operable to communicate with one or more energy harvesting modules.

2. The system of claim 1 wherein the sensory monitoring real-time integrated controller further comprises:

one or more computer processors; a memory in communication with said one or more computer processors; input and output interfaces in communication with said one or more computer processors and operable to receive and transmit analog or digital signals; and an energy recapture farm control module in communication with the one or more computer processors, wherein the said energy recapture farm control module is operable to perform one or more of the following functions: collection of environmental sensory data from one or more sensory detectors, rule-based filtering of collected sensory data, rule-based determination of out-of- band sensory events, resolution of said out-of- band sensory events, communication of one or more out-of-band sensory events and communication of resolutions of said one or more out-of-band sensory events to a command center.

3. The system of claim 1 wherein the said sensory monitoring subsystem is further operable to communicate with and to be controlled by one or more remote monitoring and control stations.

4. The system of claim 1 wherein the performance monitoring real-time integrated controller further comprises: one or more computer processors; a memory in communication with said one or more computer processors; input and output interfaces in communication with said one or more computer processors and operable to receive and transmit analog or digital signals; and an energy recapture farm control module in communication with said one or more computer processors, wherein said energy recapture farm control module is operable to perform one or more of the following functions: collection of energy recapture performance data from one or more measuring devices, comparison of energy recapture performance to a simulation of energy recapture performance, diagnosis of out-of-band performance events, resolution of said out-of-band performance events, communication of one or more out-of-band performance events and communication of resolutions of said one or more out-of-band performance events to a command center.

5. The system of claim 1 wherein the performance monitoring real-time integrated controller is further operable to communicate with and to be controlled by one or more remote monitoring and control stations.

6. The system of claim 1 wherein the said preventive maintenance subsystem further comprises: one or more computer processors; a memory in communication with said one or more computer processors; input and output interfaces in communication with said one or more computer processors and operable to receive and transmit analog or digital signals; and communication with said one or more computer processors, wherein an energy harvesting farm control module is operable to perform one or more of the following functions: collection of sequential sensory events from the one or more energy harvesting modules, collection of sequential performance streaming events from the one or more energy harvesting modules, collection of sequential events for the one or more energy harvesting modules, noting geolocation of the said one or more energy harvesting modules; assembly and storage of sequential event packets; predictive analytic forecast of expected performance using current and historical maintenance data; recommendation of auto-corrective actions by the energy harvesting control module or by deployment of maintenance crew.

7. The system of claim 1 wherein the predictive analytics subsystem is further operable to communicate with and control one or more remote monitoring and control stations.

8. A computer-based method for controlling recapturable energy, the method comprising:

(a) measuring aggregate energy output from an energy harvesting farm, wherein the energy harvesting farm comprises one or more energy harvesting modules for converting mechanical energy from vehicular traffic into electrical energy, and wherein the one or more energy harvesting modules each comprises a motion energy harvesting device coupled to an electric generator that produces energy when vehicular traffic traverses over and rotates the motion energy harvesting device;

(b) measuring the individual energy output from the one or more energy harvesting modules;

(c) collecting environmental sensory data from one or more sensory detectors;

(d) monitoring vehicular traffic for safety hazards wherein a detected safety hazard triggers protective actions, wherein the protective actions include operating electrical generators of the one or more energy harvesting modules as motors to rotate the motion harvesting devices in order to slow or stop a vehicle that poses the detected safety hazard, the monitoring based at least in part on input measurements from performance probes and environmental sensors;

(e) controlling energy production from the one or more energy harvesting modules based at least in part on the measured aggregate energy output the energy harvesting farm and the measured individual energy output of said energy harvesting modules;

(f) communicating with the one or more energy harvesting modules and controlling energy transmission for commercial power generation;

(g) performing preventative maintenance, wherein the performing preventative maintenance includes forecasting expected performance by means of predictive analytics using current and historical maintenance data wherein missing sequential event data are algorithmically imputed from current and historical data.

9. computer-based method of claim 8 wherein the collecting environmental sensory data further comprises: filtering by one or more rules the collected sensory data; determining by one or more rules the occurrence of out-of-band sensory events; resolving of said events; communicating said events and communicating resolutions of the events to a remote command center.

10. The computer-based method of claim 9 wherein missing sensory data is algorithmically imputed from current and historical data.

11. The method of claim 8 further comprising: collecting energy harvesting performance data from one or more measuring devices; comparing energy harvesting performance to a simulation of energy harvesting performance; diagnosing of out-of-band performance events; resolving said out-of-band performance events; communicating one or more out-of-band performance events and communicating one or more resolutions of the one or more out-of-band performance events to a command center.

12. The computer-based method of claim 11 wherein missing performance data is algorithmically imputed from current and historical data.

13. The computer-based method of claim 8, wherein the performing preventative maintenance further comprises: collecting of sequential sensory events from one or more energy harvesting modules; collecting sequential performance events from one or more energy harvesting modules; collecting sequential events for one or more energy harvesting modules, noting geolocation of the said energy harvesting modules; assembling and storing sequential event packets; and recommending actions by energy harvesting module for autocorrection or by deployment of a maintenance crew.

* * * * *